United States Patent
Kobayashi et al.

(10) Patent No.: US 10,411,551 B2
(45) Date of Patent: Sep. 10, 2019

(54) AC GENERATOR WITH STACKABLE PROTECTIVE COVER

(75) Inventors: Yuzuru Kobayashi, Tokyo (JP); Kazunori Tanaka, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 137 days.

(21) Appl. No.: 14/378,592

(22) PCT Filed: Apr. 18, 2012

(86) PCT No.: PCT/JP2012/060476
§ 371 (c)(1),
(2), (4) Date: Aug. 13, 2014

(87) PCT Pub. No.: WO2013/157096
PCT Pub. Date: Oct. 24, 2013

(65) Prior Publication Data
US 2014/0368094 A1 Dec. 18, 2014

(51) Int. Cl.
*H02K 5/04* (2006.01)
*H02K 5/22* (2006.01)
(Continued)

(52) U.S. Cl.
CPC ............ *H02K 5/22* (2013.01); *H02K 5/04* (2013.01); *H02K 5/10* (2013.01); *H02K 11/046* (2013.01); *H02K 15/14* (2013.01)

(58) Field of Classification Search
CPC ........ H02K 5/22; H02K 5/10; H02K 11/0073; H02K 11/046; H02K 5/04; H02K 15/14;
(Continued)

(56) References Cited

U.S. PATENT DOCUMENTS 3,480,177 A * 11/1969 Elliot ................ B65D 43/0212
206/509
5,046,632 A * 9/1991 Bordner ............... B65D 21/022
206/503
(Continued)

FOREIGN PATENT DOCUMENTS

CN 1525627 A 9/2004
DE 10230695 A1 * 1/2004 ......... B65D 43/0212
(Continued)

OTHER PUBLICATIONS

JP 07336974 A (English Translation).*
(Continued)

*Primary Examiner* — Julio C. Gonzalez
*Assistant Examiner* — Alexander Moraza
(74) *Attorney, Agent, or Firm* — Sughrue Mion, PLLC; Richard C. Turner

(57) ABSTRACT

In an AC generator, a protective cover includes a locking claw provided so as to extend outward in an axial direction from an open-side end surface of a peripheral wall portion. The locking claw includes an axial portion and a claw portion provided so as to project radially from an end portion of the axial portion. The locking claw is configured to be locked to a casing. The protective cover also includes a locking-claw restricting portion formed on an outer peripheral edge portion of a bottom portion.

15 Claims, 8 Drawing Sheets

(51) Int. Cl.
*H02K 15/14* (2006.01)
*H02K 11/04* (2016.01)
*H02K 5/10* (2006.01)

(58) Field of Classification Search
CPC .. H02K 5/00; H02K 5/08; H02K 5/20; H02K 5/26
USPC ......... 310/89, 68 D, 68 B, 402, 71; 361/600, 361/735
See application file for complete search history.

(56) References Cited

U.S. PATENT DOCUMENTS

| | | | | |
|---|---|---|---|---|
| 5,992,953 | A * | 11/1999 | Rabinovitz | A47B 87/02 312/111 |
| 6,034,452 | A * | 3/2000 | Nakamura | H02K 11/046 310/43 |
| 6,373,166 | B1 * | 4/2002 | Asao | H02K 19/22 310/179 |
| 2006/0181167 | A1 | 8/2006 | Bradfield et al. | |
| 2007/0164621 | A1 * | 7/2007 | Kano | H02K 5/225 310/71 |
| 2009/0039086 | A1 * | 2/2009 | Auer | A47J 36/027 220/367.1 |
| 2011/0189891 | A1 * | 8/2011 | Suzuki | H01R 13/648 439/607.01 |
| 2012/0027047 | A1 * | 2/2012 | Lane | G01J 5/021 374/209 |

FOREIGN PATENT DOCUMENTS

| | | | | |
|---|---|---|---|---|
| FR | 2 950 752 | A1 | | 4/2011 |
| JP | 07-336974 | A | | 12/1995 |
| JP | 07336974 | A | * | 12/1995 |
| JP | 2004-248338 | A | | 9/2004 |
| JP | 2010-124534 | A | | 6/2010 |
| JP | 4579392 | B2 | * | 11/2010 |
| JP | 2012-095451 | A | | 5/2012 |
| KR | 2003-0072659 | A | | 9/2003 |
| WO | WO 2011039480 | A2 | * | 4/2011 ............... H02K 5/20 |

OTHER PUBLICATIONS

WO 2011039480 A2 (English Translation).*
JP 4579392 B2 (English Translation).*
DE-10230695-A1 (English Translation) (Year: 2004).*
International Search Report for PCT/JP2012/060476 dated Jul. 24, 2012 [PCT/ISA/210].
Written Opinion for PCT/JP2012/070865 dated Jul. 24, 2012 [PCT/ISA/237].
Communication dated May 24, 2016 from the European Patent Office issued in corresponding Application No. 12874627.8.
Communication dated Feb. 16, 2016, from the State Intellectual Property Office of People's Republic of China in counterpart Application No. 201280071534.2.

* cited by examiner

AC GENERATOR WITH STACKABLE PROTECTIVE COVER

CROSS REFERENCE TO RELATED APPLICATIONS

This application is a National Stage of International Application No. PCT/JP2012/060476 filed Apr. 18, 2012, the contents of all of which are incorporated herein by reference in their entirety.

TECHNICAL FIELD

The present invention relates to an AC generator including a rectifier and a voltage regulator which are supported by a casing and covered with a protective cover.

BACKGROUND ART

Patent Literature 1 describes an AC generator for a vehicle, which includes a rotor rotatably supported inside a casing, a stator fitted into and supported by the casing, a rectifier provided outside the casing on one side in an axial direction thereof, for rectifying an alternating current generated in the stator, a voltage regulator for regulating a magnitude of a voltage, and a protective cover including locking claws locked to the casing so as to cover the rectifier and the voltage regulator.

CITATION LIST

Patent Literature

[PTL 1] Japanese Patent Application No. 2010-240598

SUMMARY OF INVENTION

Technical Problem

In an assembling step for the above-mentioned AC generator for a vehicle, when the protective cover having a cylindrical shape with a closed end is assembled to the casing, it is conceivable that a plurality of prepared protective covers interfere with each other to provide poor storage performance, resulting in lowered space efficiency around the assembly step.

Thus, in order to prevent a peripheral wall portion of the protective cover from being deformed due to the mutual interference between the plurality of protective covers, it is desired to stack the plurality of protective covers in the axial direction. In such a case, the locking claws projecting outward in the axial direction from an open-side end surface of the peripheral wall portion may be locked to the protective cover which is located beneath.

Then, there is a problem in that the locking claws and peripheries of intake holes formed in a bottom portion of the protective cover are damaged as a result of the unnecessary locking.

The present invention has been made to solve the problems described above, and has an object to provide an AC generator with improved productivity, which is capable of preventing a plurality of protective covers from interfering with each other due to unnecessary locking of locking claws to cause damage when the plurality of protective covers are stacked, and of smoothly supplying each of the protective covers to a manufacturing line in an assembling step for the AC generator.

Solution to Problem

According to one embodiment of the present invention, there is provided an AC generator, including: a rotor rotatably supported inside a casing; a stator including a stator core and a stator winding wound around the stator core, the stator being supported by the casing so as to surround the rotor; a rectifier provided outside the casing on one side in an axial direction thereof, for rectifying an alternating current generated in the stator winding; a voltage regulator provided outside the casing on the one side in the axial direction thereof, for regulating a magnitude of an AC voltage generated in the stator; and a protective cover including a bottom portion and a peripheral wall portion having a cylindrical shape, the protective cover being configured to be locked to the casing so as to cover the rectifier and the voltage regulator, the protective cover including a ventilation hole.

The protective cover includes a locking claw provided so as to extend outward in the axial direction from an open-side end surface of the peripheral wall portion, the locking claw including an axial portion and a claw portion provided so as to project radially from an end portion of the axial portion, the locking claw being configured to be locked to the casing. The protective cover includes a locking-claw restricting portion formed on an outer peripheral edge portion of the bottom portion.

Advantageous Effects of Invention

According to the AC generator of one embodiment of the present invention, the protective cover includes the locking-claw restricting portion formed on the outer peripheral edge portion of the bottom portion. Therefore, when a plurality of the protective covers are stacked, damage, which is caused by the interference between the protective covers due to the unnecessary locking of the locking claws, is prevented to enable reliable stacking. Moreover, in the assembling step for the AC generator, each of the protective covers can be smoothly supplied to a manufacturing line to improve productivity.

DESCRIPTION OF EMBODIMENTS

Figure 1:
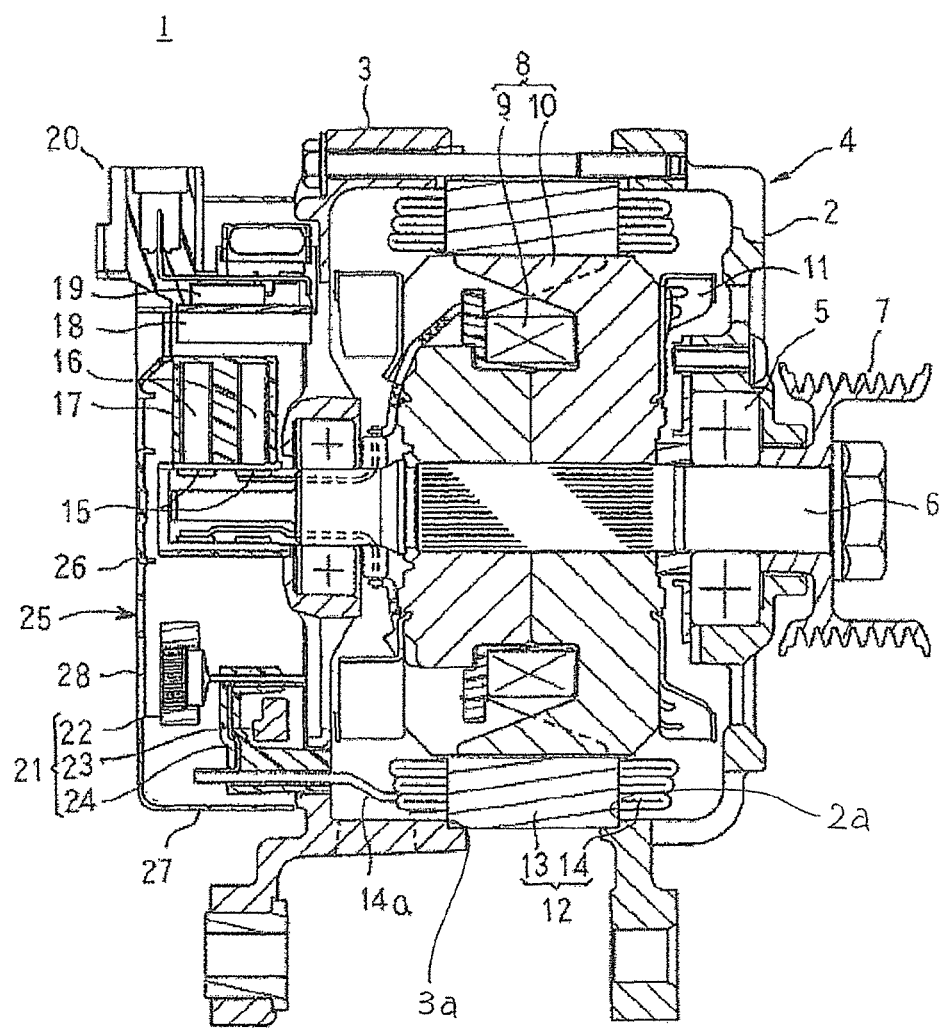
FIG. 1 is a sectional side view illustrating an AC generator for a vehicle according to a first embodiment of the present invention.

Now, an AC generator 1 for a vehicle according to each of embodiments of the present invention is described with reference to the drawings. In the drawings, the same or corresponding components or parts are denoted by the same reference symbols for description.

First Embodiment

Figure 2:
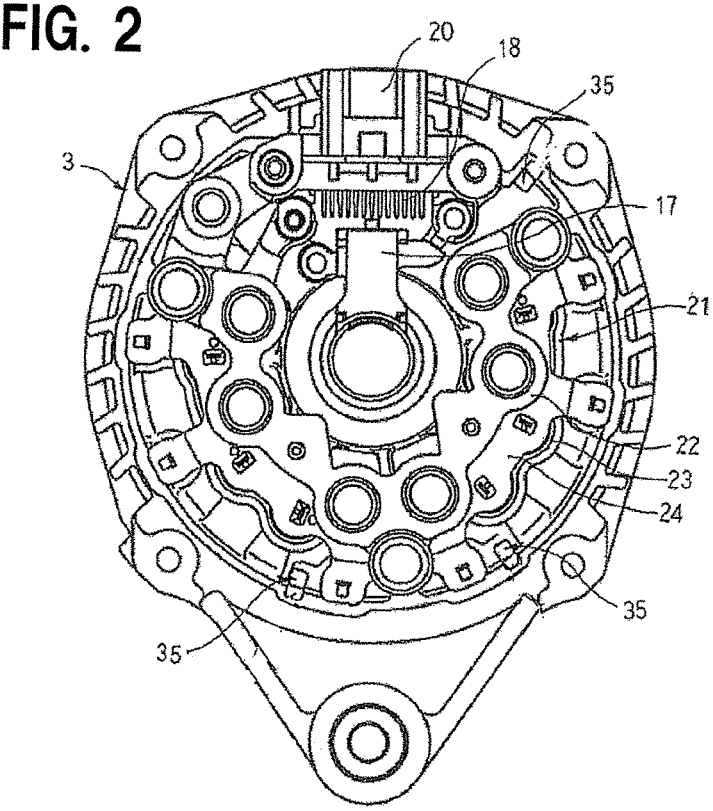
FIG. 2 is a front view illustrating the AC generator for a vehicle illustrated in FIG. 1 as viewed from a rear bracket side in a state in which a protective cover is not mounted.
Figure 3:
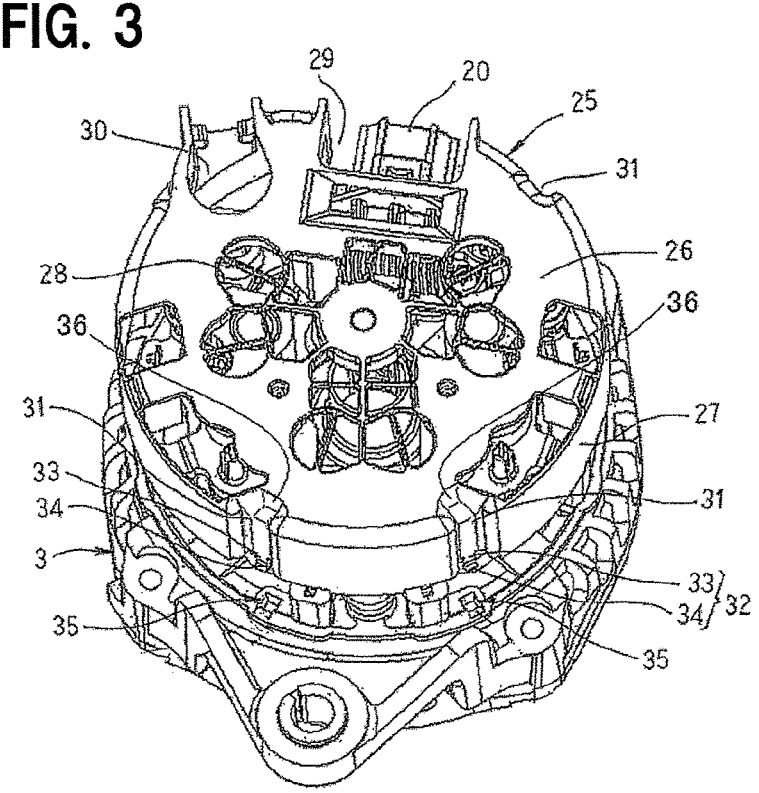
FIG. 3 is a perspective view illustrating the AC generator for a vehicle illustrated in FIG. 1 immediately before the protective cover is mounted to a casing 4.
Figure 4:
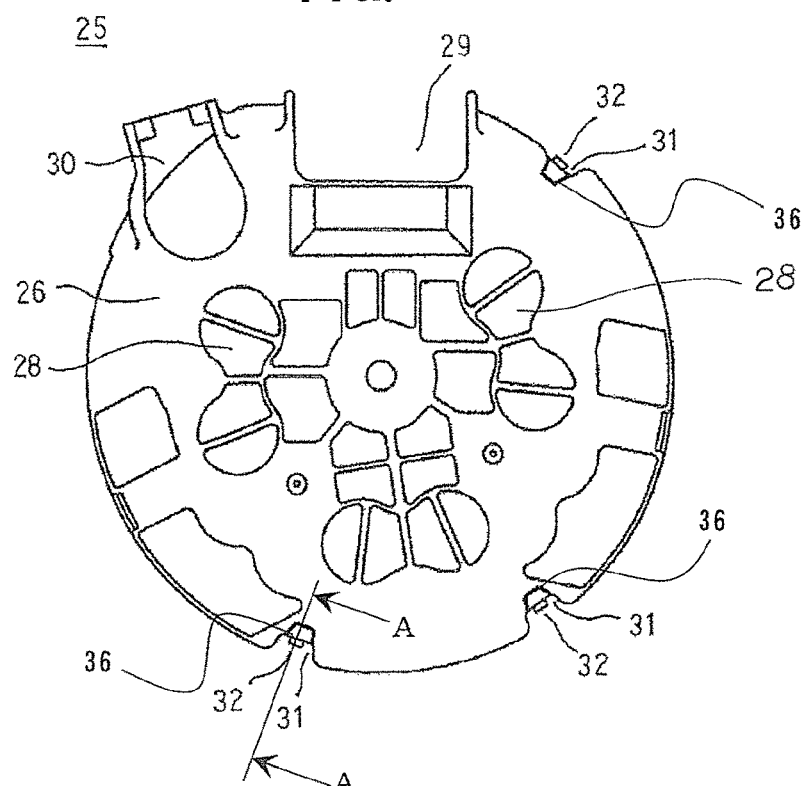
FIG. 4 is a front view illustrating the protective cover illustrated in FIG. 1
Figure 5:
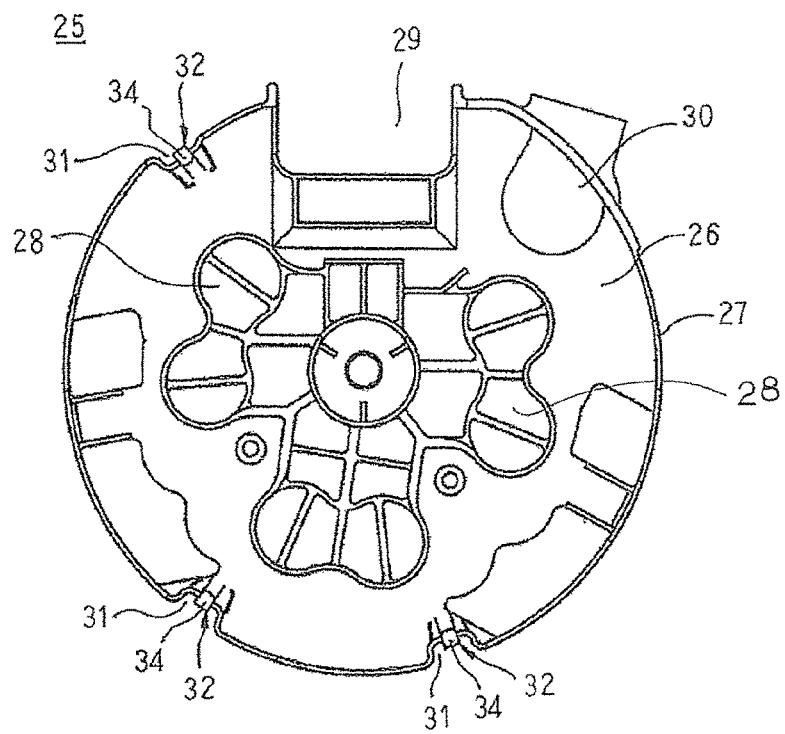
FIG. 5 is a rear view of FIG. 4.
Figure 6:
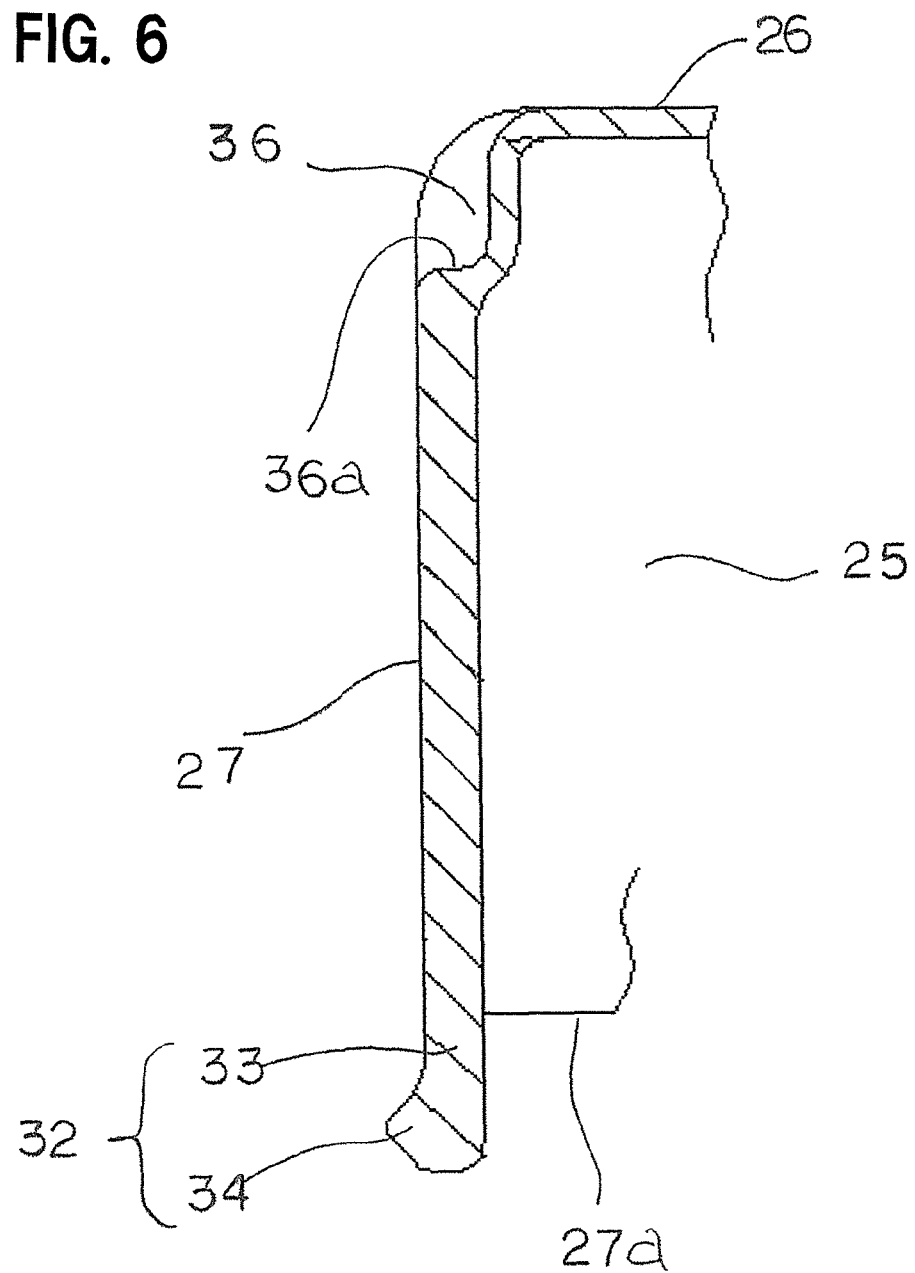
FIG. 6 a sectional view taken along the line A-A in FIG. 4.
Figure 7:
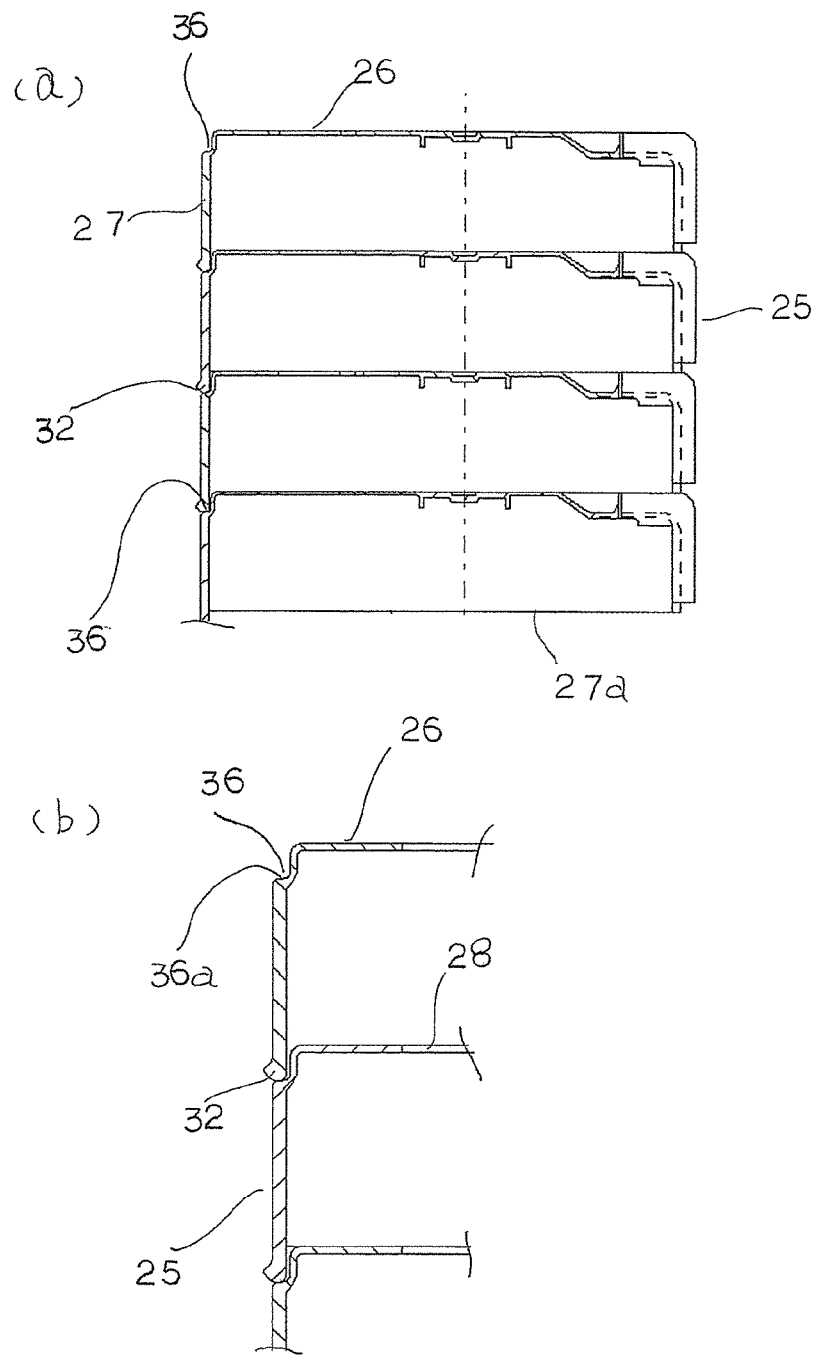
FIG. 7 (a) is a sectional view illustrating a state in which a plurality of protective covers are mounted, and FIG. 7 (b) is a partial enlarged view of FIG. 7 (a).

FIG. 1 is a sectional side view illustrating an AC generator 1 for a vehicle according to a first embodiment of the present invention, FIG. 2 is a front view illustrating the AC generator 1 for a vehicle illustrated in FIG. 1 as viewed from a rear bracket 3 side in a state in which a protective cover 25 is not mounted, and FIG. 3 is a perspective view illustrating the AC generator 1 for a vehicle illustrated in FIG. 1 immediately before the protective cover 25 is mounted to a casing 4.

The AC generator 1 for a vehicle according to the first embodiment includes the casing 4 including a front bracket 2 and the rear bracket 3, each having an approximately bowl-like shape and being made of aluminum, a shaft 6 rotatably supported by the casing 4 through an intermediation of a pair of bearings 5, a pulley 7 firmly fixed to an end of the shaft 6, the end extending to a front side of the casing 4, a rotor 8 fixed to the shaft 6 and provided inside the casing 4, fans 11 fixed to both end surfaces of the rotor 8 in an axial direction thereof, a stator 12 fixed to the casing 4 so as to surround the rotor 8, a pair of slip rings 15 for supplying a current to the rotor 8, which is fixed to an end of the shaft 6, the end extending to a rear side of the casing 4, a pair of brushes 16 slidable on surfaces of the respective slip rings 15, and a brush holder 17 for housing the brushes 16 therein.

The AC generator 1 for a vehicle also includes a voltage regulator 19 for regulating a magnitude of an AC voltage generated in the stator 12, the voltage regulator 19 being mounted to a heat sink 18 which is provided outside the rear bracket 3 in the axial direction and provided on an outer-diameter side of the brush holder 17, a connector 20 for input and output of a signal between the voltage regulator 19 or the like and an external device (not shown), the connector 20 being formed integrally with a mounting portion of the heat sink 18, a rectifier 21 provided outside the rear bracket 3 in the axial direction thereof, for rectifying the AC voltage generated in the stator 12 into a DC voltage, and the protective cover 25 mounted to the rear bracket 3 so as to cover the brush holder 17, the voltage regulator 19, and the rectifier 21.

The rotor 8 is a Lundell-type rotor, and includes a field winding 9 for generating a magnetic flux by a flow of an exciting current therethrough and a pole core 10 provided so as to cover the field winding 9, in which magnetic poles are formed by the magnetic flux.

Moreover, the stator 12 includes a stator core 13 having a cylindrical shape, and stator windings 14 wound around the stator core 13, in which an alternating current is generated by a change in the magnetic flux from the field winding 9 along with the rotation of the rotor 8. The stator 12 is configured so that the stator core 13 is sandwiched between an open-end surface 2a of the front bracket 2 and an open-end surface 3a of the rear bracket 3 on both sides in the axial direction.

The rectifier 21 includes a positive-pole side heat sink 22 on which a plurality of positive-pole side rectifying elements (not shown) are mounted, a negative-pole side heat sink 23 on which a plurality of negative-pole side rectifying elements (not shown) are mounted, and a circuit board 24, and is formed into an approximately C-like shape as viewed from the axial direction with the circuit board 24 being sandwiched between the positive-pole side heat sink 22 and the negative-pole side heat sink 23. The positive-pole side rectifying elements and the negative-pole side rectifying elements are connected so as to configure a predetermined bridge circuit through an intermediation of the circuit board 24.

The thus configured rectifier 21 is provided in a plane orthogonal to the axis of the shaft 6 on an outer peripheral side of the slip rings 15 so as to have a fan-like pattern about the shaft 6, and is fixed by tightening to an outer end portion of the rear bracket 3.

Then, a lead wire 14a of each of the stator windings 14 is drawn from the rear bracket 3 to be connected to a terminal of the circuit board 24, thereby electrically connecting the rectifier 21 and the stator windings 14 to each other.

Moreover, the brush holder 17 is provided between distal ends of the approximately C-like shape of the rectifier 21, and is fixed by tightening to the outer end portion of the rear bracket 3.

Next, a configuration of the protective cover 25 is described referring to FIGS. 4 to 7.

The protective cover 25 having a cylindrical shape with a closed end is made of an insulating thermoplastic resin such as polybutylene terephthalate (PBT) or Nylon 66, and includes a bottom portion 26 and a peripheral wall portion 27 having a cylindrical shape. Intake holes 28, which are a plurality of ventilation holes, are formed in the bottom portion 26.

Moreover, for the protective cover 25, the bottom portion 26 and the peripheral wall portion 27 are partially cut out to form a connector draw hole 29. An output-terminal extraction hole 30 is formed on one side of the connector draw hole 29 in a circumferential direction. Further, three concave portions 31 are formed on portions of the peripheral wall portion 27 so that each of the three concave portions 31 is formed continuously from an open-end surface 27a of the peripheral wall portion 27 to the bottom portion 26 so as to be recessed to an inner-diameter side. One of the three concave portions 31 is formed on the protective cover 25 on another side of the connector draw hole 29 in the circumferential direction. The remaining two concave portions 31 are formed on the side opposite to the connector draw hole 29 so as to be separated away from each other in the circumferential direction.

The protective cover 25 also includes locking claws 32 which project outward in the axial direction from the open-end surface 27a of the peripheral wall portion 27 to be locked with locking holes 35 of the rear bracket 3. The locking holes 35 are formed in an outer peripheral edge portion of the rear bracket 3 so as to be respectively opposed to the locking claws 32.

Each of the locking claws 32 includes an axial portion 33 provided in a central position of each of the concave portions 31 in the circumferential direction, which projects outward in the axial direction from the open-end surface 27a of the peripheral wall portion 27, and a claw portion 34 provided to project outward in a radial direction of the peripheral wall portion 27 from an end portion of the axial portion 33 so as to be tapered toward a distal end portion thereof. When the protective cover 25 is mounted onto the rear bracket 3, a direction in which the axial portions 33 project from the open-end surface 27a of the peripheral wall portion 27 approximately coincides with the axial direction of the shaft 6.

Moreover, for the protective cover 25, recessed portions 36, which are locking-claw restricting portions, are formed on an outer peripheral edge portion of the bottom portion 26 of the protective cover 25 on the side opposite to the axial portions 33. The recessed portions 36 are partially further recessed to an inner-diameter side in the concave portions 31.

In contrast to the casing 4 which is responsible for supporting the rotor 8 and supporting the mounting of the AC generator 1 for a vehicle to an engine, the protective cover 25 has a function of protecting components provided outside the casing 4, such as the voltage regulator 19 and the rectifier 21, from exposure to water and adhesion of a foreign substance. Therefore, the protective cover 25 is not required to have high stiffness, and thus is manufactured to have a thickness which enables elastic deformation.

The protective cover 25 is not required to have high stiffness. Thus, the bowl-like shape with a small thickness has a configuration in which an opening side (open side) thereof is particularly vulnerable to deformation. Therefore, careful handling is needed during an assembling step. As a more stable storage state, axial-direction stacking is adopted.

The protective cover 25 is moved in an approximately axial direction with respect to the rear bracket 3 which is a target of assembly so as to be assembled thereto. Therefore, the axial-direction stacking is convenient for the movement and assembly described above.

FIGS. 7(a) and 7(b) are diagrams illustrating a state in which a plurality of the protective covers 25 are stacked along the axial direction. Inside the concave portions 36 of one of the protective covers 25, the locking claws 32 of the protective cover 25 stacked on the top of the one protective cover 25 are received without locking thereto when the plurality of protective covers 25 are mounted.

In FIGS. 7(a) and 7(b), distal end portions of the axial portions 33 of the locking claws 32 are held in contact with bottom surfaces 36a of the recessed portions 36.

Alternatively, when the plurality of protective covers 25 are stacked, a stable stacked state may also be obtained by performing positioning in a state in which the open-end surface 27a of the peripheral wall portion 27 is held in surface contact with the bottom portion 26 of the protective cover 25 stacked beneath.

In this case, the distal end portions of the axial portions 33 of the locking claws 32 are away from the bottom surfaces 36a of the recessed portions 36. Thus, when the protective covers 25 are stacked, the thin axial portions 33 do not collide against the bottom surfaces 36a of the recessed portions 36 to be damaged.

In the AC generator 1 for a vehicle configured as described above, a field current is supplied from a battery (not shown) through the brushes 16 and the slip rings 15 to the field winding 9 to generate the magnetic flux. The magnetic flux forms the N-poles and the S-poles on an outer circumference of the pole core 10 alternately in the circumferential direction.

On the other hand, a rotation torque of the engine is transferred to the shaft 6 through a belt (not shown) and the pulley 7 to rotate the rotor 8. Then, a rotating field is applied to the stator windings 14 of the stator 12 to generate electromotive forces in the stator windings 14. Then, each of the AC electromotive forces generated in the stator windings 14 is rectified into a direct current by the rectifier 21. After a magnitude of an output voltage thereof is regulated by the voltage regulator 19, the direct current is supplied to the battery and in-vehicle electric loads.

The fans 11 rotate in conjunction with the rotation of the rotor 8. After outside air is taken into the protective cover 25 through the intake holes 28 to cool the heat sink 18 and the rectifying elements, the outside air flows into the rear bracket 3. Then, the outside air flowing to the vicinity of the fans 11 is bent in a centrifugal direction by the fans 11 to cool coil ends of the stator windings 14. Then, the outside air is exhausted externally.

The protective cover 25 is mounted to the rear bracket 3 so as to cover the voltage regulator 19 and the rectifier 21. Hence, a flying object does not directly hit the voltage regulator 19 and the rectifier 21. Thus, the occurrence of damage to the voltage regulator 19 and the rectifier 21 is suppressed.

Moreover, the water exposure of the voltage regulator 19 and the rectifier 21 and the adhesion of a foreign substance to the voltage regulator 19 and the rectifier 21 are suppressed.

Moreover, the intake holes 28 are opposed to the heat sink 18 for the voltage regulator 19 and the rectifying elements of the rectifier 21. Hence, the outside air taken into the protective cover 25 through the intake holes 28 is directly supplied to the heat sink 18 and the rectifying elements. As a result, the voltage regulator 19 and the rectifier 21 are efficiently cooled.

According to the AC generator 1 of this embodiment, the protective cover 25 includes the recessed portions 36 formed on the outer peripheral edge portion of the bottom portion, which are the locking-claw restricting portions for receiving the locking claws 32 of the protective cover 25 stacked thereon when the protective covers 25 are stacked.

Therefore, when the plurality of protective covers 25 are stacked, the locking claws 32 are prevented from being unnecessarily locked to peripheries of the intake holes 28 formed in the bottom portion of the protective cover 25 and damaging the peripheries of the intake hole 28.

Moreover, in the assembling step of the AC generator 1, the plurality of protective covers 25, which are reliably stacked, can be individually supplied to the manufacturing line in a smooth manner. As a result, productivity is improved.

Further, the protective cover 25 is manufactured by integral molding using the thermoplastic resin which is not an expensive material, and therefore is also advantageous in terms of costs.

Second Embodiment

Figure 8:
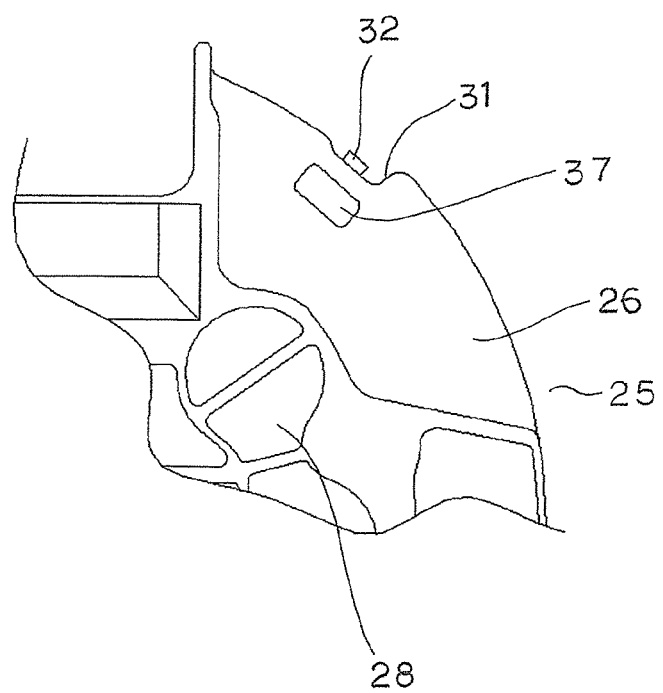
FIG. 8 is a partial front view illustrating a protective cover in an AC generator for a vehicle according to a second embodiment of the present invention.
Figure 9:
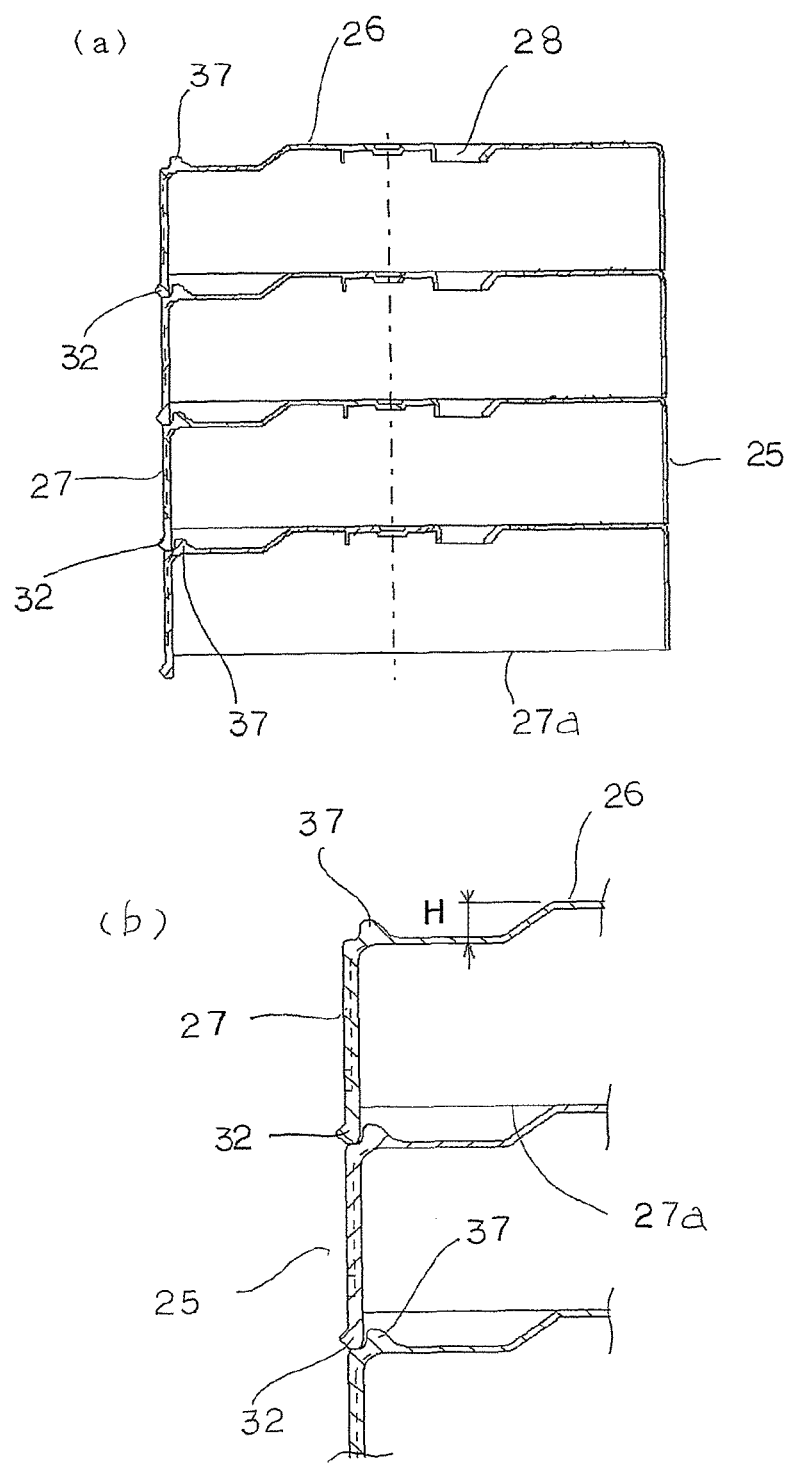
FIG. 9(a) is a sectional view illustrating a state in which the plurality of the protective covers illustrated in FIG. 8 are stacked.
FIG. 9(b) is a partially enlarged view of FIG. 9(a).

FIG. 8 is a partial front view illustrating the protective cover 25 in the AC generator 1 for a vehicle according to a second embodiment of the present invention, FIG. 9(a) is a sectional view illustrating a state in which the plurality of the protective covers 25 illustrated in FIG. 8 are stacked, and FIG. 9(b) is a partially enlarged view of FIG. 9(a).

In the first embodiment, the locking-claw restricting portions of the protective cover 25 in the case where the bottom portion 26 of the protective cover 25 is flat have been described. This embodiment describes an example where there is a level difference between axial heights of the voltage regulator 19, the rectifier 21, and the like, which are to be covered with the protective cover 25, and the protective cover 25 has a level difference H corresponding to the above-mentioned level difference.

In this embodiment, projecting portions 37 are formed on a lower-side peripheral edge portion of the bottom portion 26 of the protective cover 25. The projecting portions 37 projecting in the axial direction are the locking-claw restricting portions which face the locking claws 32 of the projecting cover 25 stacked on the top thereof. When the protective covers 25 are stacked, there is a gap between a planar outer wall surface of each of the projecting portions 37 and an inner wall surface of each of the locking claws 32. For the movement in the circumferential direction, however, the locking claws 32, each moving on a circular trajectory, come into contact with the planar outer wall surfaces of the projecting portions 37 to restrict the movement of the stacked protective covers 25 in the circumferential direction.

The projecting portions 37 are formed at three positions at intervals in the circumferential direction.

The remaining configuration is the same as that of the AC generator 1 for a vehicle according to the first embodiment.

In this embodiment, even when the bottom surface 26 of the protective cover 25 has the level difference, the same effects as those obtained in the first embodiment can be obtained by forming the projecting portions 37, which are the locking-claw restricting portions, on the projective cover 25.

Third Embodiment

Figure 10:
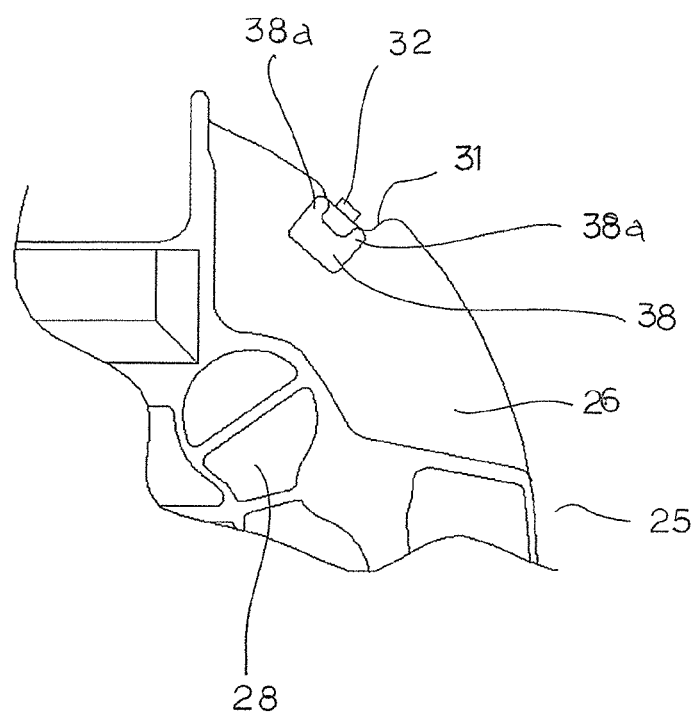
FIG. 10 is a partial front view illustrating the protective cover of the AC generator for a vehicle according to a third embodiment of the present invention.

FIG. 10 is a partial front view illustrating the protective cover 25 of the AC generator 1 for a vehicle according to a third embodiment of the present invention.

In this embodiment, projecting portions 38 which project in the axial direction are formed at three positions on the outer peripheral edge portion of the bottom portion 26 of the protective cover 25 at intervals in the circumferential direction.

Each of the projecting portions 38 which are the locking-claw restricting portions includes convex portions 38a formed on both sides thereof in the circumferential direction.

When the plurality of protective covers 25 are stacked, the locking claw 32 is held between the both convex portions 38a. As a result, the rotation of the protective cover 25 in the circumferential direction is inhibited by the convex portions 38a.

The remaining configuration is the same as that of the AC generator 1 for a vehicle according to the first embodiment.

For each of the projecting portions 38, any one of the projecting portions 38a may be provided.

In this embodiment, by forming the projecting portions 38 which are the locking-claw restricting portions on the projective cover 25, the same effects as those obtained in the first embodiment are obtained.

In each of the embodiments described above, the number of the locking claws 32 is three. Correspondingly, the locking-claw restricting portions for receiving the locking claws 32 therein are formed at three positions. However, the number of the locking claws 32 is not required to be plural in some cases. In the case where the number of the locking claws 32 is two, it is desired that the locking claws 32 be formed so as to be approximately point-symmetric with respect to a center of the protective cover 25. The locking-claw restricting portions are formed so as to correspond thereto.

Moreover, although the locking-claw restricting portions are formed immediately above the locking claws 32 in each of the embodiments, the locking-claw restricting portions are not necessarily required to be formed immediately above. The locking-claw restricting portions may be formed at any positions as long as a distance between the locking-claw restricting portions in the circumferential direction and a distance between the locking claws 32 in the circumferential direction are equal to each other.

Moreover, although the peripheral wall portion 27 of the projective cover 25 is formed to have the cylindrical shape in each of the embodiments described above, the shape of the peripheral wall portion 27 of the protective cover 25 is not limited to the cylindrical shape. The shape may be any approximately cylindrical shape which surrounds an outer peripheral side of the rectifier 21 and the voltage regulator 19 mounted to the outer end portion of the rear bracket 3.

Further, although the protective cover 25 is manufactured of the thermoplastic resin in each of the embodiments described above, the protective cover may be manufactured by coating a metal plate with a non-conductive resin for some cylindrical shapes with a closed end. In this case, the formation with deep drawing is possible. Thus, costs can be further cut.

Moreover, although the AC generator to be mounted in a vehicle has been described as an example in the present invention, it is apparent that the AC generator may also be mounted in an object other than vehicles.

REFERENCE SIGNS LIST

1 AC generator for vehicle, 2 front bracket, 3 rear bracket, 4 casing, 5 bearing, 6 shaft, 7 pulley, 8 rotor, 9 field winding, 10 pole core, 11 fan, 12 stator, 13 stator core, 14a lead wire, 14 stator winding, 15 slip ring, 16 brush, 17 brush holder, 18 heat sink, 19 voltage regulator, 20 connector, 21 rectifier, 22 positive-pole side heat sink, 23 negative-pole side heat sink, 24 circuit board, 25 protective cover, 26 bottom portion, 27 peripheral wall portion, 27a open-end surface, 28 intake hole (ventilation hole), 29 hole, 30 hole, 31 concave portion, 32 locking claw, 33 axial portion, 34 claw portion, 35 locking hole, 36 recessed portion (locking-claw restricting portion), 37, 38 projecting portion (locking-claw restricting portion), 38a convex portion

The invention claimed is:

1. An AC generator, comprising:
a rotor rotatably supported inside a casing and fixed to a shaft that is rotatably supported by the casing;
a stator comprising a stator core and a stator winding wound around the stator core, the stator being supported by the casing so as to surround the stator;
a rectifier provided outside the casing on one side in an axial direction of the shaft, for rectifying an alternating current generated in the stator winding;
a voltage regulator provided outside the casing on the one side in the axial direction of the shaft, for regulating a magnitude of an AC voltage generated in the stator; and
a protective cover comprising a bottom portion and a peripheral wall portion having a cylindrical shape, the protective cover being configured to be locked to the casing so as to cover the rectifier and the voltage regulator, the protective cover including a ventilation hole,
wherein the protective cover comprises a locking claw provided so as to extend outward in the axial direction of the shaft from an open-side end surface of the peripheral wall portion, the locking claw being provided in a central position of a concave portion formed in the peripheral wall portion, the locking claw comprising an axial portion and a claw portion provided so as to project radially from an end portion of the axial portion, the locking claw being configured to be locked to the casing, and
wherein the protective cover comprises a locking-claw restricting portion formed on an outer peripheral edge portion of the bottom portion, the locking-claw restricting portion being configured to engage a locking claw of an adjacent protective cover when the protective cover and the adjacent protective cover are stacked together to thereby inhibit rotation of the protective cover and the adjacent protective cover relative to one another, wherein the locking-claw restricting portion comprises a projecting portion projecting away from the open-side end surface in the axial direction of the shaft, the projecting portion projecting from a surface of the outer peripheral edge portion, the projecting portion projecting a distance in the axial direction of the shaft beyond the surface of the outer peripheral edge portion.

2. An AC generator according to claim 1, wherein the locking-claw restricting portion is formed on an axial line of the locking claw.

3. An AC generator according to claim 1, wherein the locking-claw restricting portion comprises a recessed portion which is recessed radially inward.

4. An AC generator according to claim 1, wherein the projecting portion includes a convex portion projecting radially outward, which is formed on at least one of both sides of the projecting portion in a circumferential direction.

5. An AC generator according to claim 1, wherein the protective cover is made of a thermoplastic resin.

6. An AC generator according to claim 1, wherein the projective cover is made of a metal coated with a non-conductive resin.

7. An AC generator according to claim 1, wherein the AC generator comprises an AC generator for a vehicle.

8. An AC generator according to claim 1, wherein the protective cover is configured to be stacked with an adjoining protective cover during storage.

9. An AC generator according to claim 8, wherein the locking-claw restricting portion of the protective cover engages a locking claw of the adjoining protective cover to prevent rotational movement of the adjoining protective cover relative to the protective cover.

10. An AC generator according to claim 8, wherein the locking-claw restricting portion of the protective cover engages a locking claw of the adjoining protective cover to prevent circumferential movement of the adjoining protective cover relative to the protective cover.

11. An AC generator according to claim 1, wherein the concave portion extends from the bottom portion of the protective cover to the open-side end surface of the peripheral wall portion.

12. An AC generator according to claim 1, wherein a height of the protective cover in the axial direction at the peripheral wall portion is larger than a height of the protective cover in the axial direction at a central portion of the protective cover.

13. An AC generator according to claim 1, wherein
when the adjacent protective cover is stacked on the protective cover in the axial direction, the locking claw of the adjacent protective cover contacts the projecting portion extending outward in the axial direction from the bottom portion of the protective cover so as to restrict a movement of the adjacent protective cover in a circumferential direction.

14. An AC generator according to claim 12, wherein
when the adjacent protective cover is stacked on the protective cover in the axial direction, the locking claw of the adjacent protective cover contacts the projecting portion extending outward in the axial direction from the bottom portion of the protective cover so as to restrict a movement of the adjacent protective cover in a circumferential direction.

15. The AC generator according to claim 1, wherein the surface of the outer peripheral edge portion from which the locking-claw restricting portion projects is perpendicular to the axial direction of the shaft.

* * * * *